United States Patent
Kamaga

(10) Patent No.: US 8,223,004 B2
(45) Date of Patent: Jul. 17, 2012

(54) CONTROL DEVICE AND CONTROL METHOD FOR VEHICLE

(75) Inventor: Ryuichi Kamaga, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/129,519

(22) PCT Filed: Dec. 5, 2008

(86) PCT No.: PCT/JP2008/072130
§ 371 (c)(1),
(2), (4) Date: May 16, 2011

(87) PCT Pub. No.: WO2010/064315
PCT Pub. Date: Jun. 10, 2010

(65) Prior Publication Data
US 2011/0227714 A1 Sep. 22, 2011

(51) Int. Cl.
*B60Q 1/00* (2006.01)
(52) U.S. Cl. ............ 340/438; 701/22; 702/57; 180/65.1
(58) Field of Classification Search .................. 340/438; 180/65.1; 303/9; 701/22; 702/57, 58; 318/139
See application file for complete search history.

(56) References Cited

U.S. PATENT DOCUMENTS

| | | | | | |
|---|---|---|---|---|---|
| 5,677,604 | A | * | 10/1997 | Masaki et al. | 318/139 |
| 5,951,115 | A | * | 9/1999 | Sakai et al. | 303/3 |
| 6,244,674 | B1 | * | 6/2001 | Kuno et al. | 303/152 |
| 6,472,769 | B1 | * | 10/2002 | Long et al. | 307/9.1 |
| 2007/0289399 | A1 | | 12/2007 | Tanba et al. | |
| 2008/0210497 | A1 | * | 9/2008 | Jeon | 188/72.1 |

FOREIGN PATENT DOCUMENTS

| JP | A-02-018141 | 1/1990 |
|---|---|---|
| JP | U-06-008130 | 2/1994 |
| JP | A-07-039012 | 2/1995 |
| JP | A-09-322313 | 12/1997 |
| JP | A-10-273021 | 10/1998 |
| JP | A-2007-055565 | 3/2007 |
| JP | A-2007-331654 | 12/2007 |
| JP | A-2008-252990 | 10/2008 |

OTHER PUBLICATIONS

International Search Report in International Application No. PCT/JP2008/072130; dated Mar. 10, 2009 (with English-language translation).

* cited by examiner

*Primary Examiner* — George Bugg
*Assistant Examiner* — Edny Labbees
(74) *Attorney, Agent, or Firm* — Oliff & Berridge, PLC

(57) ABSTRACT

If a condition about the state of a vehicle is satisfied, if charging connectors are being connected, and if a parking position has been released, an ECU performs a program including the steps of performing brake pressure increase control and performing notification control.

18 Claims, 5 Drawing Sheets

CONTROL DEVICE AND CONTROL METHOD FOR VEHICLE

TECHNICAL FIELD

The present invention relates to control over a vehicle having, as a drive source, a motor that is actuated by electric power supplied from a power storage device, and particularly to control over the vehicle in the case of charging the power storage device using a power supply outside the vehicle.

BACKGROUND ART

In recent years, hybrid vehicles, fuel cell vehicles, electric vehicles and the like that run using driving force from a motor have received attention as one of the countermeasures against environmental problems. These vehicles are equipped with a power storage device for supplying electric power to the motor. In addition, a technique of controlling a state of a vehicle during charging of a power storage device using a power supply outside the vehicle has been known.

Japanese Patent Laying-Open No. 09-322313 (Patent Document 1), for example, discloses an electric vehicle preventing movement of the vehicle during charging and controlling a state of the vehicle during charging without being influenced even by chattering of a connection detection signal of a charging connector and the like. This electric vehicle is provided with a housing for a charging terminal, which has a built-in charging terminal to which an output terminal of a charger for charging a storage battery for driving the electric vehicle is connected, and which is selectively covered with a lid, and includes first interlock means for allowing charging only when a gear position of an automatic transmission for causing the vehicle to run is in a parking position, and second interlock means for inhibiting movement of the gear position of the automatic transmission from the parking position during charging of the storage battery for driving the electric vehicle.

According to the electric vehicle disclosed in the above publication, the first interlock means allows charging only when the gear position of the automatic transmission for causing the vehicle to run is in the parking position, and the second interlock means inhibits movement of the gear position of the automatic transmission from the parking position during charging of the storage battery for driving the electric vehicle.

Patent Document 1: Japanese Patent Laying-Open No. 09-322313

DISCLOSURE OF THE INVENTION

Problems to be Solved by the Invention

In the electric vehicle disclosed in the above publication, however, components such as a shift lock solenoid are required to inhibit movement of the gear position from the parking position during charging, which leads to an increase in the number of components and the cost.

The present invention has been made to solve the above problems, and an object thereof is to provide a control device and a control method for a vehicle that reliably restrict a position of the vehicle during charging using a power supply outside the vehicle, while suppressing an increase in the number of components and the cost.

Means for Solving the Problems

A control device for a vehicle according to an aspect of the present invention is directed to a control device for a vehicle having at least a motor as a drive source. The vehicle includes a power storage device for supplying electric power to the motor, a charging connector for connection to an external power supply arranged outside the vehicle and used to charge the power storage device, a wheel, and a braking device for restricting rotation of the wheel. The control device includes: a connection state detecting unit for detecting that the charging connector and the external power supply are being connected; a release detecting unit for detecting that a parking state of the vehicle has been released; and a control unit receiving outputs from the connection state detecting unit and the release detecting unit. The control unit controls the braking device such that a degree of restriction of rotation of the wheel increases, when a control condition that the charging connector and the external power supply are being connected and the parking state has been released is satisfied.

According to the present invention, the braking device is controlled such that the degree of restriction of rotation of the wheel increases, when the control condition that the charging connector and the external power supply are being connected and the parking state has been released is satisfied. Since the degree of restriction of the braking device is increased, movement of the vehicle during charging can be restricted, even if restriction of movement of the vehicle is removed as a result of release of the parking state. In addition, such control can be performed using existing components without providing new components. Accordingly, there can be provided a control device and a control method for a vehicle that reliably restrict a position of the vehicle during charging using a power supply outside the vehicle, while suppressing an increase in the number of components and the cost.

Preferably, the control device further includes a gradient detecting unit for detecting a gradient of a road surface. The control unit controls the braking device such that the degree of restriction of rotation of the wheel increases, when a condition that the gradient is equal to or larger than a predetermined gradient is satisfied in addition to the control condition.

According to the present invention, the degree of restriction of rotation of the wheel by the braking device is increased, when the condition that the gradient of the road surface is equal to or larger than the predetermined gradient is satisfied in addition to the control condition. As a result, movement of the vehicle can be reliably restricted.

More preferably, the braking device includes an electric pump for generating hydraulic pressure. The control unit controls the electric pump such that the degree of restriction of rotation of the wheel increases, when the control condition is satisfied.

According to the present invention, the electric pump is controlled when the control condition is satisfied. As a result, the degree of restriction of rotation of the wheel can be increased. Therefore, when the parking state is released during charging of the power storage device using the external power supply, movement of the vehicle can be reliably restricted.

More preferably, the vehicle further includes an auxiliary battery for supplying electric power to the electric pump. The control device further includes a charge amount detecting unit for detecting an amount of charge of the auxiliary battery. The control unit controls the braking device such that the degree of restriction of rotation of the wheel increases, when a condition that the amount of charge is equal to or larger than a predetermined amount of charge is satisfied in addition to the control condition.

According to the present invention, when the condition that the amount of charge of the auxiliary battery is equal to or larger than the predetermined amount of charge is satisfied in addition to the control condition, the electric pump is actuated using electric power of the auxiliary battery, for example, and movement of the vehicle can be reliably restricted.

More preferably, the vehicle further includes a transmission for restricting movement of the vehicle when the vehicle shifts to the parking state and removing the restriction when the parking state is released. The transmission causes the vehicle to shift to the parking state when a parking position is selected as a shift position. The transmission is provided with a parking lock mechanism for restricting rotation of a shaft coupled to the wheel of the vehicle using a gear mechanism when the parking position is selected.

According to the present invention, when the parking position is released, restriction of rotation of the shaft coupled to the wheel of the vehicle is removed. If the power storage device is being charged using the external power supply at this time, the braking device is controlled such that the degree of restriction of the wheel increases, and thus, movement of the vehicle can be restricted.

Effects of the Invention

According to the present invention, there can be provided a control device and a control method for a vehicle that reliably restrict a position of the vehicle during charging using an external power supply, while suppressing an increase in the number of components and the cost.

Figure 1:
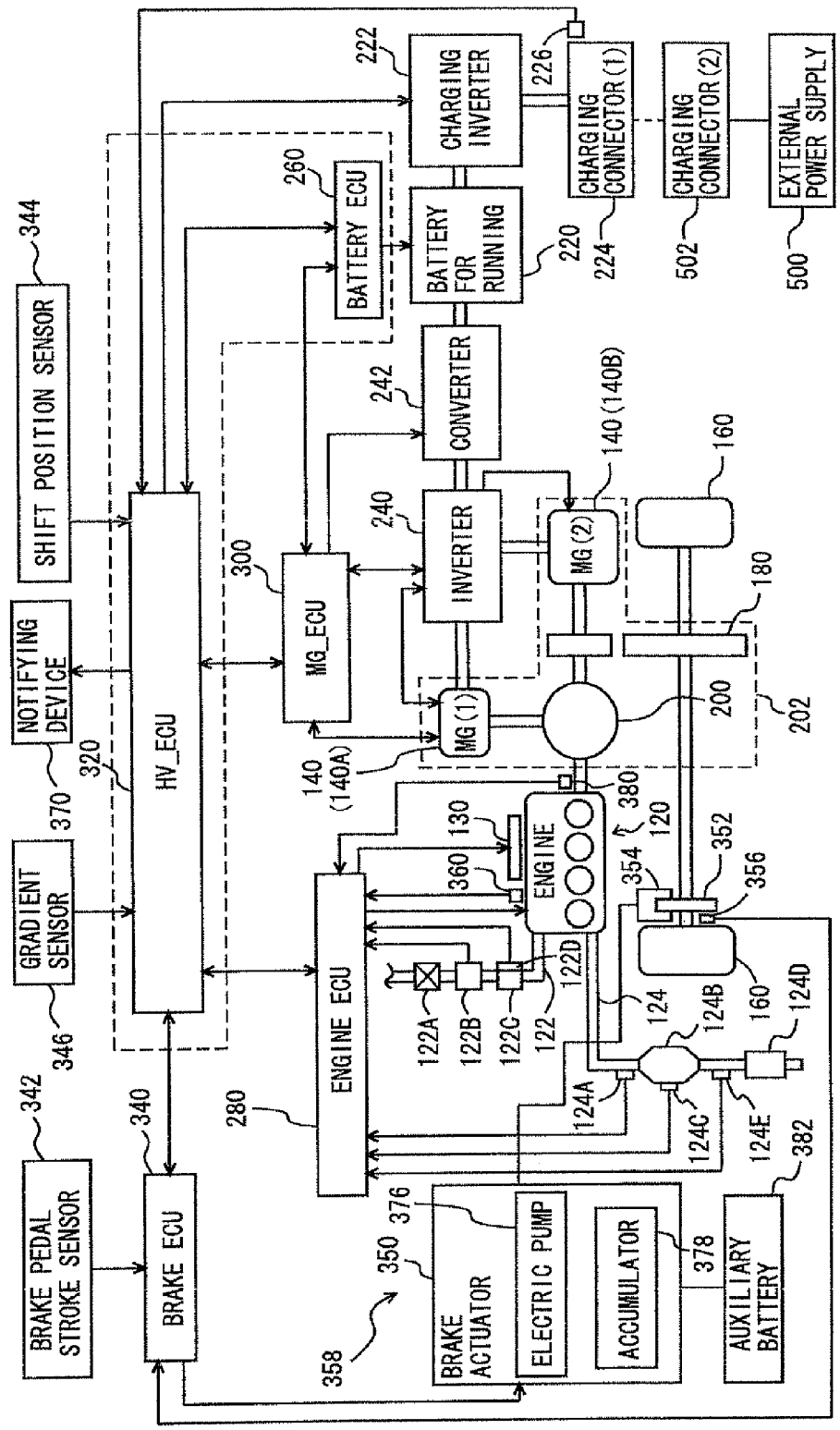
FIG. 1 is a schematic block diagram showing an overall configuration of a hybrid vehicle.

DESCRIPTION OF THE REFERENCE SIGNS 106 parking lock pole; 108 parking lock gear; 120 engine; 122 intake air passage; 122A air cleaner; 122B airflow meter; 122C electronic throttle; 122D throttle position sensor; 124 exhaust air passage; 124A air-fuel ratio sensor; 124B three-way catalytic converter; 124C catalyst temperature sensor; 124D silencer; 124E oxygen sensor; 130 fuel injection device; 140 motor generator; 140A generator; 140B motor; 160 wheel; 180 reduction gear; 200 power split device; 202 transmission; 204 gear tooth; 208 protrusion; 210 parking lock cam; 212 shaft; 220 battery for running; 222 charging inverter; 226 coupling check sensor; 240 inverter; 242 converter; 260 battery ECU; 280 engine ECU; 300 MG_ECU; 320 HV_ECU; 340 brake ECU; 342 brake pedal stroke sensor; 344 shift position sensor; 346 gradient sensor; 348 shift lever; 350 brake actuator; 352 brake rotor; 354 brake caliper; 356 wheel speed sensor; 358 braking device; 360 water temperature detecting sensor; 370 notifying device; 376 electric pump; 380 crank position sensor; 382 auxiliary battery; 384 voltmeter; 400 condition satisfaction determining unit; 402 connection state determining unit; 404 parking release determining unit; 406 brake pressure control unit; 408 notification control unit; 500 external power supply

BEST MODES FOR CARRYING OUT THE INVENTION

Embodiments of the present invention will be described hereinafter with reference to the drawings. In the following description, the same components are denoted with the same reference characters. Their names and functions are also the same. Therefore, detailed description on them will not be repeated.

A control block diagram of a hybrid vehicle equipped with a control device for the vehicle according to an embodiment of the present invention will be described with reference to FIG. 1. Although the hybrid vehicle is described as one example in the present embodiment, the vehicle is not particularly limited to the hybrid vehicle. The present invention may be applied to an electric vehicle, for example. In the present embodiment, the vehicle is a vehicle having at least a motor as a drive source and equipped with a power storage device for supplying electric power to the motor. In addition, in the present embodiment, the power storage device can be charged using a power supply outside the vehicle.

Although, in the present embodiment, the power storage device is described as a battery for supplying electric power to the motor and a power conversion device (e.g., an inverter and a converter) for appropriately converting electric power supplied to the motor, the power storage device is not particularly limited thereto. The power storage device may be, for example, a battery for supplying electric power to electrical equipment different from the above electrical equipment (the motor and the power conversion device).

The hybrid vehicle includes an internal combustion engine (referred to as "engine" hereinafter) 120 serving as a drive source and a transmission 202. Transmission 202 includes a motor generator (MG) 140 serving as a rotating electric machine, a power split device 200 and a reduction gear 180. Although motor generator 140 is represented as a generator 140A and a motor 140B in FIG. 1 for the sake of convenience in description, generator 140A may function as a motor or motor 140B may function as a generator, depending on the running state of the hybrid vehicle.

An intake air passage 122 of engine 120 is provided with an air cleaner 122A for capturing dust of the intake air, an airflow meter 122B for detecting the amount of air taken through air cleaner 122A into engine 120, and an electronic throttle 122C having a throttle valve for adjusting the amount of air taken into engine 120. Electronic throttle 122C is provided with a throttle position sensor 122D. An engine ECU (Electronic Control Unit) 280 receives the amount of intake air detected by airflow meter 122B, the opening degree of electronic, throttle 122C detected by throttle position sensor 122D, and the like.

Engine 120 is provided with a plurality of cylinders and a fuel injection device 130 for supplying fuel to each of the plurality of cylinders. Fuel injection device 130 injects an appropriate amount of fuel to each cylinder at an appropriate timing based on a fuel injection control signal from engine ECU 280.

In addition, an exhaust air passage 124 of engine 120 is provided with a three-way catalytic converter 124B, an air-fuel ratio sensor 124A for detecting the air-fuel ratio (A/F) in the exhaust gas introduced into three-way catalytic converter 124B, a catalyst temperature sensor 124C for detecting the temperature of three-way catalytic converter 124B, a silencer 124D, and an oxygen sensor 124E for detecting the concentration of oxygen in the exhaust gas discharged from three-way catalytic converter 124B.

In addition, engine ECU 280 receives a signal indicating the temperature of engine cooling water, from a water temperature detecting sensor 360 for detecting the temperature of the cooling water of engine 120. An output shaft of engine 120 is provided with a crank position sensor 380, and engine ECU 280 receives a signal indicating the rotation speed of the output shaft from crank position sensor 380.

Reduction gear 180 transmits motive power generated by engine 120 and motor generator 140 to a wheel 160 serving as a driving wheel, or transmits driving force of wheel 160 to engine 120 and motor generator 140. Power split device 200 is, for example, a planetary gear mechanism and divides the motive power generated by engine 120 into two paths, that is, wheel 160 (i.e., motor 140B) and generator 140A. For example, a sun gear of the planetary gear mechanism is connected to generator 140A, a carrier is connected to engine 120, and a ring gear is connected to motor 140B. A transmission mechanism may also be provided between the ring gear and motor 140B.

In addition, the hybrid vehicle further includes an inverter 240 and a battery 220 for running, which serves as "power storage device" in the present embodiment. Battery 220 for running stores electric power for driving motor generator 140. It is to be noted that a capacitor and the like may be used as the power storage device instead of the battery for running. Inverter 240 serves as "power conversion device" that performs current control while making a conversion between direct current of battery 220 for running and alternating current of generator 140A and motor 140B.

Moreover, the hybrid vehicle further includes a battery control unit (referred to as "battery ECU" hereinafter) 260, engine ECU 280, an MG_ECU 300, and an HV_ECU 320.

Battery ECU 260 manages and controls a state of charge and discharge of battery 220 for running. Engine ECU 280 controls a state of operation of engine 120. MG_ECU 300 controls motor generator 140, battery ECU 260, inverter 240 and the like in accordance with a state of the hybrid vehicle. HV_ECU 320 mutually manages and controls battery ECU 260, engine ECU 280, MG_ECU 300, a brake ECU 340 and the like, and controls the overall hybrid system such that the hybrid vehicle can run most efficiently.

A shift position sensor 344 for detecting the position of a shift lever, (not shown) is connected to HV_ECU 320. Shift position sensor 344 transmits a shift position signal indicating the position of the shift lever to HV_ECU 320. Furthermore, a gradient sensor 346 for detecting the gradient of a road surface on which the vehicle runs is connected to HV_ECU 320. Gradient sensor 346 transmits a gradient signal indicating the gradient of the road surface to HV_ECU 320. Gradient sensor 346 is implemented by, for example, a G sensor and the like.

In addition, a notifying device 370 is connected to HV_ECU 320. Notifying device 370 notifies a driver of information in response to a notification control signal from HV_ECU 320.

In the present embodiment, a converter 242 is provided between battery 220 for running and inverter 240. This is because the rated voltage of battery 220 for running is lower than the rated voltages of generator 140A and motor 140B, and thus, when electric power is supplied from battery 220 for running to generator 140A and/or motor 140B, converter 242 boosts the electric power. This converter 242 has a built-in smoothing capacitor, and electric charge is stored in this smoothing capacitor when converter 242 performs the boost operation.

Moreover, the hybrid vehicle in the present embodiment further includes brake ECU 340 and a braking device 358.

Braking device 358 includes a brake pedal (not shown), a master cylinder (not shown), a brake rotor 352, a brake caliper 354, and a brake actuator 350.

Brake rotor 352 is fixed to a rotation shaft of wheel 160 and rotates together with wheel 160. Brake caliper 354 is provided to sandwich brake rotor 352 from a direction parallel to the rotation shaft using hydraulic pressure.

Brake actuator 350 includes a solenoid valve (not shown), an electric pump 376, and an accumulator 378. Brake actuator 350 is connected to the master cylinder and receives, from the master cylinder, supply of the hydraulic pressure generated as a result of operation of the brake pedal (farce of pressing the brake pedal).

Electric pump 376 receives supply of electric power from an auxiliary battery 382 and generates the hydraulic pressure based on a control signal from brake ECU 340. Accumulator 378 stores the hydraulic pressure generated as a result of actuation of electric pump 376. The solenoid valve adjusts the hydraulic pressure stored in accumulator 378 and the hydraulic pressure supplied from the master cylinder, based on the control signal from brake ECU 340, and supplies the hydraulic pressure to brake caliper 354.

The manner of supply of the hydraulic pressure is not limited to the manner of supply of the hydraulic pressure via accumulator 378. For example, the hydraulic pressure generated by electric pump 376 may be adjusted using the solenoid valve and supplied directly to brake caliper 354.

A wheel speed sensor 356 for detecting the rotation speed of wheel 160 is connected to brake ECU 340. Wheel speed sensor 356 transmits a signal indicating the rotation speed of wheel 160 to brake ECU 340. Furthermore, a brake pedal stroke sensor 342 for detecting the amount of operation of the brake pedal is connected to brake ECU 340. Brake pedal stroke sensor 342 transmits a signal indicating the amount of operation of the brake pedal to brake ECU 340. It is to be noted that a pressing force detecting sensor (e.g., master cylinder pressure sensor) for detecting the force of pressing the brake pedal by the driver may be used instead of brake pedal stroke sensor 342.

Brake ECU 340 controls brake actuator 350 such that braking force corresponding to the driver's intention is generated based on the received amount of operation of the brake pedal.

Although the respective ECUs are provided separately in FIG. 1, two or more ECUs may be integrated into an ECU (by way of example, battery ECU 260 and HV_ECU 320 may be integrated into an ECU, as shown by dotted lines in FIG. 1).

A driver's seat is provided with an accelerator pedal (not shown) and an accelerator pedal position sensor (not shown) detects the amount of pressing the accelerator pedal. The accelerator pedal position sensor outputs a signal indicating the amount of pressing the accelerator pedal to HV_ECU 320. In accordance with requested driving force corresponding to the amount of pressing the accelerator pedal, HV_ECU 320 controls the output of engine 120 or the amount of electric power generated by engine 120, using generator 140A, motor 140B and engine ECU 280.

The planetary gear mechanism (planetary gear) is used as power split device 200 to distribute the motive power of engine 120 to both wheel 160 and generator 140A. By controlling the rotation speed of generator 140A, power split device 200 also functions as a continuously variable transmission.

In the hybrid vehicle equipped with the hybrid system as shown in FIG. 1, the hybrid vehicle runs using only motor 140B of motor generator 140 when engine 120 operates with low efficiency at the start of driving, during low speed running or the like. During normal running, power split device 200, for example, divides the motive power of engine 120 into the two paths, that is, one for directly driving wheel 160 and the other for driving generator 140A to generate electric power. At this time, motor 140B is driven by the generated electric power to assist driving of wheel 160. In addition, during high speed running, electric power from battery 220 for running is further supplied to motor 140B to increase an output of motor 140B, so that additional driving force is given to wheel 160.

On the other hand, during deceleration and during braking operation, motor 140B operating following wheel 160 functions as the generator to perform regeneration, and recovered electric power is stored in battery 220 for running. When battery 220 for running has a reduced amount of charge and particularly requires charging, the output of engine 120 is increased and the amount of electric power generated by generator 140A is increased, thereby increasing the amount of charge of battery 220 for running. As a matter of course, control of increasing the driving force of engine 120 is performed as necessary in some cases even during low speed running. This includes, for example, the case where battery 220 for running requires charging as described above, the case where auxiliary equipment such as an air conditioner is driven, the case where the temperature of the cooling water of engine 120 is increased to a predetermined temperature, and the like.

Furthermore, in the hybrid vehicle equipped with the hybrid system as shown in FIG. 1, engine 120 is stopped to enhance the fuel efficiency, depending on the driving state of the vehicle and the state of battery 220 for running. Thereafter, the driving state of the vehicle and the state of battery 220 for running are still detected to restart engine 120 using generator 140A. As described above, this engine 120 operates intermittently. This hybrid vehicle is different from a conventional vehicle (a vehicle equipped with only an engine) in that in the conventional vehicle, once an ignition switch is turned to the START position and the engine starts, the engine does not stop until the ignition switch is switched from the ON position to the ACC position or the OFF position.

In the present embodiment, a parking lock mechanism 206 may be provided within transmission 202. Parking lock mechanism 206 may be provided at any position as long as parking lock mechanism 206 is provided at the rotation shaft between wheel 160 and transmission 202. It is to be noted that parking lock mechanism 206 does not have to be provided in the vehicle.

Figure 2:
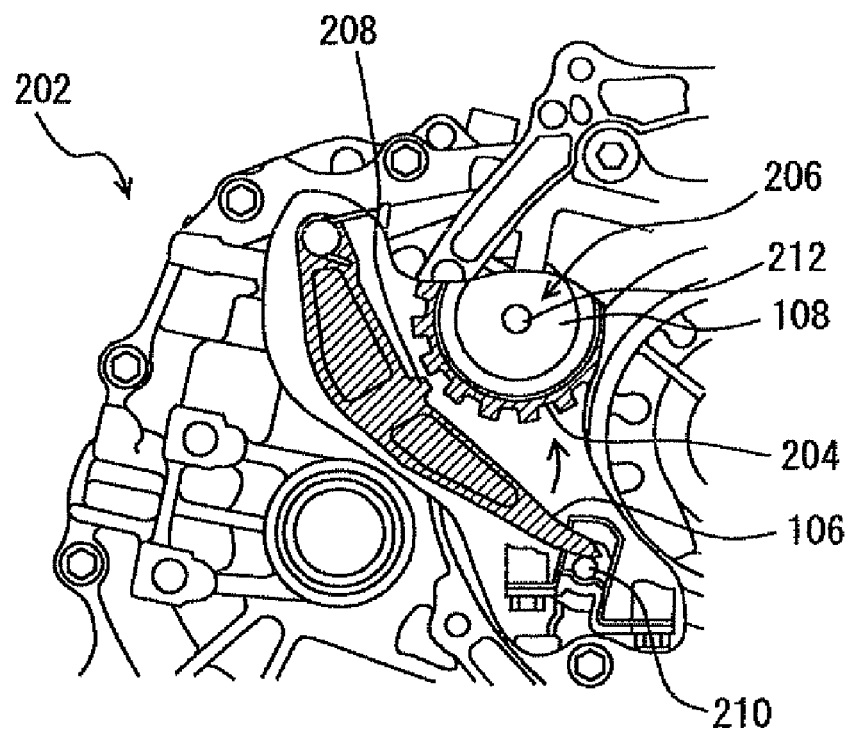
FIG. 2 shows a configuration of a parking lock mechanism.

Parking lock mechanism 206 is formed of a parking lock gear 108 and a parking lock pole 106 as shown in FIG. 2. In the present embodiment, parking lock gear 108 may be provided at an output shaft of transmission 202, or may be provided at a shaft of a gear engaged with the output shaft. Parking lock gear 108 has a disc shape and is provided with a plurality of gear teeth 204 along the direction of rotation of a shaft 212.

Parking lock pole 106 is supported by a housing of transmission 202 such that one end thereof is freely rotatable. A protrusion 208 meshing with gear tooth 204 of parking lock gear 108 is provided in the center of parking lock pole 106. At the other end of parking lock pole 106, a parking lock cam 210 is provided to abut parking lock pole 106. Parking lock cam 210 has, for example, a conical shape and when parking lock cam 210 moves from the back side to the front side of the sheet in FIG. 2, the other end of parking lock pole 106 rotationally moves in the direction of an arrow in FIG. 2 along a sloped portion of the conical shape. In accordance with the movement of the shift lever to a position corresponding to the parking position, parking lock cam 210 moves from the back side to the front side of the sheet in FIG. 2. At this time, parking lock cam 210 may be actuated by driving the actuator, or may be mechanically actuated in conjunction with the driver's operation of the shift lever. When protrusion 208 of parking lock pole 106 moves, as a result of driving of parking lock cam 210, to a predetermined position where protrusion 208 meshes with gear tooth 204 of parking lock gear 108, rotation of parking lock gear 108 is restricted. As described above, when the parking position is selected, parking lock mechanism 206 is actuated, thereby restricting rotation of wheel 160. In addition, when the parking position is released, restriction of rotation of parking lock gear 108, that is, rotation of wheel 160 is removed.

Returning to FIG. 1, the hybrid vehicle further includes a charging connector (1) 224 on the vehicle side for connection to an external power supply 500 arranged outside the vehicle, and a charging inverter 222 receiving AC electric power from external power supply 500 via charging connector (1) 224. External power supply 500 is, for example, a household power supply.

Charging inverter 222 is connected to battery 220 for running and supplies DC electric power for charging to battery 220 for running.

Charging connector (1) 224 on the vehicle side is provided with a coupling check sensor 226. When a charging connector (2) 502 on the external power supply 500 side provided at the end of a charging cable extending from external power supply 500 is connected to charging connector (1) 224, coupling check sensor 226 transmits, to HV_ECU 320, a signal indicating that charging connector (2) 502 has been connected to charging connector (1) 224.

Charging connector (1) 224 and charging connector (2) 502 have such shapes that charging connector (1) 224 and charging connector (2) 502 can fit each other (e.g., a plug and a socket).

When charging connector (2) 502 is connected to charging connector (1) 224 or when an input is received from external power supply 500, HV_ECU 320 starts up the vehicle power supply and supplies electric power to a system related to charging (e.g., charging inverter 222 and the like), and charging of battery 220 for running using external power supply 500 starts.

Figure 3:
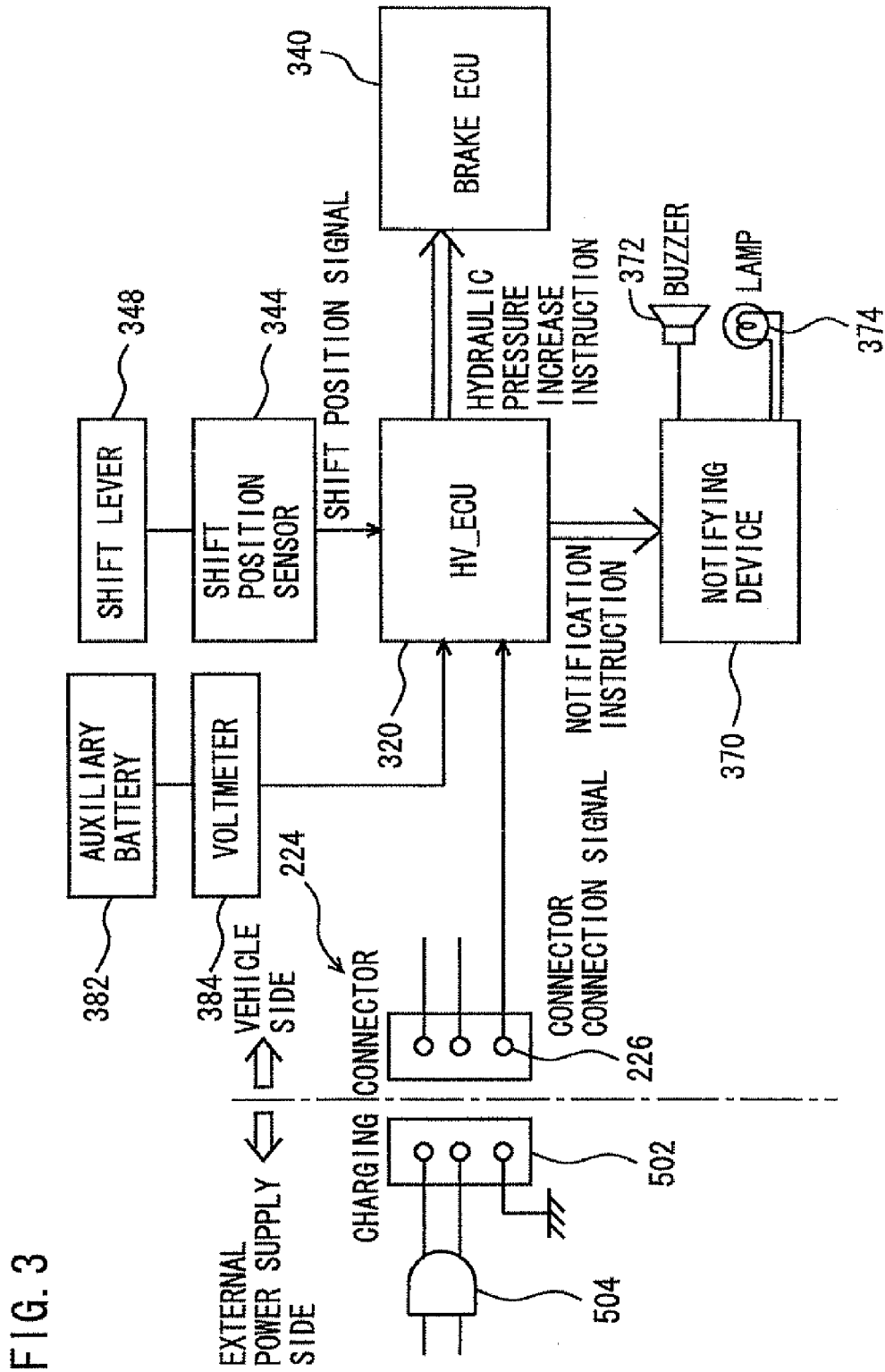
FIG. 3 is a schematic block diagram showing a part of the configuration of the hybrid vehicle.

In the present embodiment, coupling check sensor 226 is described as using one terminal (denoted as "coupling check terminal" hereinafter) of a plurality of terminals provided at charging connector (1) 224 as shown in FIG. 3. In other words, when charging connector (2) 502 is connected to charging connector (1) 224, the coupling check terminal is connected to a grounded terminal on the charging connector (2) 502 side. HV_ECU 320 applies a voltage to a signal line connected to the coupling check terminal and detects voltage changes in the signal line. When receiving, as a connector connection signal, an output voltage that has changed when charging connector (2) 502 has been connected to charging connector (1) 224, HV_ECU 320 determines that charging connector (2) 502 has been connected to charging connector (1) 224.

Coupling check sensor 226 may be, for example, a sensor detecting magnetic force of a magnet provided on the charging connector (2) 502 side, or a push-button sensor pressed when charging connector (1) 224 is coupled to charging connector (2) 502, and is not particularly limited to the above type. In addition, in FIG. 3, a plug at the other end of the charging cable provided with charging connector (2) 502 is connected to external power supply 500.

In addition, the manner is described in the present embodiment, in which electric power supplied from external power supply 500 is supplied to battery 220 for running via charging inverter 222. The manner of external charging is not, however, particularly limited to this manner. For example, the electric power from external power supply 500 may be supplied via a neutral point of generator 140A or motor 140B to charge battery 220 for running.

In addition, notifying device 370 is connected to a buzzer 372 and a lamp 374 as shown in FIG. 3. Notifying device 370 generates a warning sound using buzzer 372 and the like or turns on lamp 374 of a meter at the driver's seat in response to a notification instruction from HV_ECU 320.

Furthermore, auxiliary battery 382 is provided with a voltmeter 384. Voltmeter 384 transmits a signal indicating the voltage of auxiliary battery 382 to HV_ECU 320. HV_ECU 320 calculates an amount of charge of auxiliary battery 382 based on the received voltage of auxiliary battery 382. It is to be noted that HV_ECU 320 may detect the amount of charge of auxiliary battery 382 using other well-known techniques. In addition, the signal from voltmeter 384 may be transmitted to HV_ECU 320 via battery ECU 260, or a result obtained by calculating the amount of charge of auxiliary battery 382 in battery ECU 360 may be transmitted to HV_ECU 320.

In the vehicle having the configuration as described above, the present embodiment is characterized in that when a control condition that charging connector (1) 224 is being connected to charging connector (2) 502 and the parking state has been released as a result of operation of a shift lever 348 is satisfied, HV_ECU 320 controls braking device 358 such that the degree of restriction of rotation of wheel 160 increases.

Specifically, as shown in FIG. 3, when HV_ECU 320 receives the connector connection signal from coupling check sensor 226 and when the shift position received from shift position sensor 344 is changed from the parking position to a shift position different from the parking position, HV_ECU 320 transmits, to brake ECU 340, an instruction to increase the hydraulic pressure supplied to brake caliper 354. In addition to transmission of the hydraulic pressure increase instruction, HV_ECU 320 transmits, to notifying device 370, a notification instruction such that notifying device 370 notifies the driver that return of the shift position to the parking position is recommended.

In addition, when a condition about the state of the vehicle is satisfied in addition to the hydraulic pressure increase condition of reception of the connector connection signal and change from the parking position to the shift position different from the parking position, HV_ECU 320 may transmit the hydraulic pressure increase instruction to braking device 358. The condition about the state of the vehicle may be, for example, a condition that the gradient of the road surface is equal to or larger than a predetermined gradient, or a condition that the amount of charge of auxiliary battery 382 is equal to or larger than a predetermined amount of charge. The predetermined gradient may only be a gradient by which the vehicle at least starts moving by gravity and may only be set by an experiment and the like. In addition, the predetermined amount of charge may only be an amount of charge that can at least actuate brake actuator 350 and may only be set by an experiment and the like.

Figure 4:
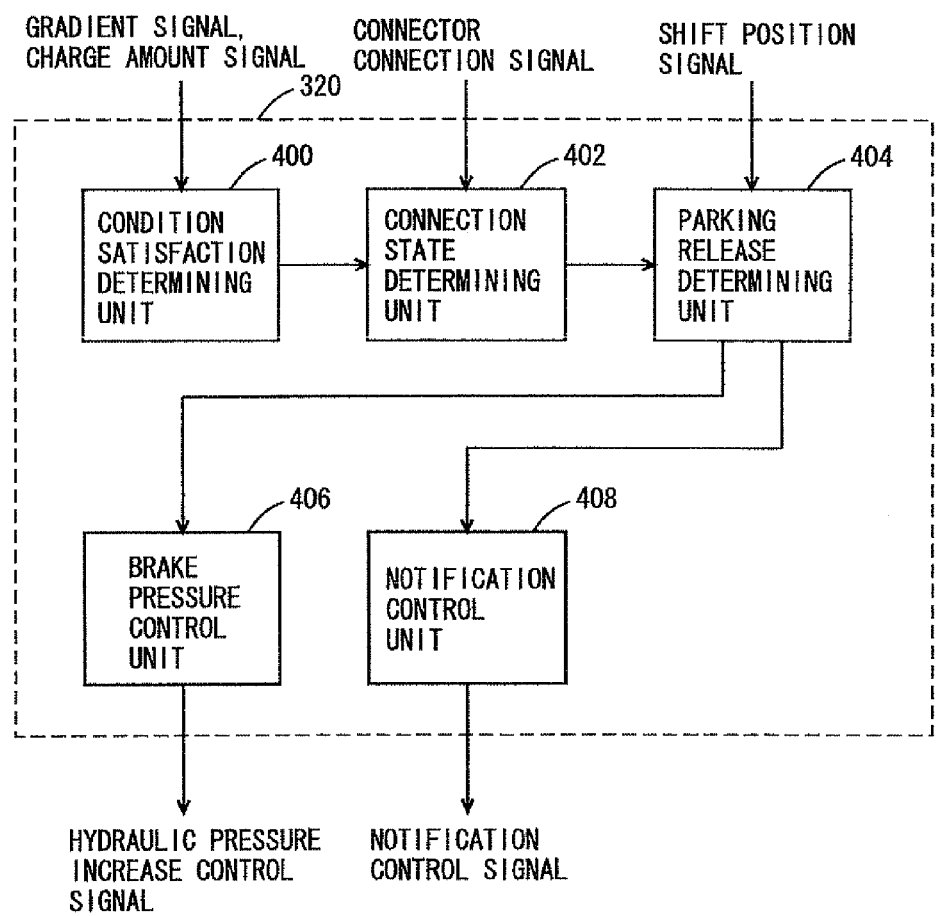
FIG. 4 is a functional block diagram of an HV_ECU, which is a control device for the vehicle according to the present embodiment.

FIG. 4 shows a functional block diagram of HV_ECU 320, which is the control device for the vehicle according to the present embodiment. HV_ECU 320 includes a condition satisfaction determining unit 400, a connection state determining unit 402, a parking release determining unit 404, a brake pressure control unit 406, and a notification control unit 408.

Condition satisfaction determining unit 400 determines whether or not the condition about the state of the vehicle has been satisfied. For example, condition satisfaction determining unit 400 may determine whether or not the gradient of the road surface is equal to or larger than the predetermined gradient, based on the gradient signal received from gradient sensor 346, or may determine whether or not the amount of charge based on the voltage of auxiliary battery 382 received from voltmeter 384 is equal to or larger than the predetermined value, or may determine whether or not release of the parking position is at least possible (specifically, whether or not IG of the vehicle is turned on and selection of the neutral position is at least possible). When the condition about the state of the vehicle is satisfied, condition satisfaction determining unit 400 may turn on a condition satisfaction flag.

Connection state determining unit 402 determines whether or not charging connector (1) 224 and charging connector (2) 502 are being connected. When receiving the connector connection signal from coupling check sensor 226, connection state determining unit 402 determines that charging connector (1) 224 and charging connector (2) 502 are being connected. Connection state determining unit 402 may turn on a connection state determination flag when determining that charging connector (1) 224 and charging connector (2) 502 are being connected, for example.

Parking release determining unit 404 determines whether or not the parking position has been released. In other words, when the shift position is switched from the parking position to the shift position other than the parking position, parking release determining unit 404 determines that the parking position has been released. Specifically, when receiving, from shift position sensor 344, a shift position signal indicating the shift position (e.g., the D position, the N position and the R position) different from the parking position in the case where the parking position is selected, parking release determining unit 404 determines that the parking position has been released. Parking release determining unit 404 may turn on a parking release determination flag when determining that the parking position has been released.

When the condition about the state of the vehicle is satisfied, when charging connector (1) 224 and charging connector (2) 502 are being connected, and when the parking position is released, brake pressure control unit 406 controls braking device 358 such that the degree of restriction of rotation of the wheel increases. Specifically, brake pressure control unit 406 transmits a hydraulic pressure increase control signal to brake ECU 340 such that the hydraulic pressure supplied to brake caliper 354 increases by predetermined hydraulic pressure. When receiving the hydraulic pressure increase control signal from HV_ECU 320, brake ECU 340 controls brake actuator 350, thereby increasing the degree of restriction of rotation of the wheel. Brake pressure control unit 406 may control braking device 358 such that the degree of restriction of rotation of the wheel increases, when the condition satisfaction flag, the connection state determination flag and the parking release determination flag are all ON, for example.

When the condition about the state of the vehicle is satisfied, when charging connector (1) 224 and charging connector (2) 502 are being connected, and when the parking position is released, notification control unit 408 controls notifying device 370 to notify the driver that return of the shift position to the parking position is recommended. Notification may be provided, for example, by displaying characters, images or the like on a meter or a display, in addition to turning on lamp 374, or may be provided by sounds and the like from a speaker, in addition to sounding of buzzer 372.

In the present embodiment, condition satisfaction determining unit 400, connection state determining unit 402, parking release determining unit 404, brake pressure control unit 406, and notification control unit 408 are each described as functioning as software implemented by a CPU (Central Processing Unit) executing a program stored in a memory. They may, however, be implemented by hardware. Such a program is recorded in a recording medium and mounted on the vehicle. Various information, programs, threshold values, maps and the like are stored in the memory and are read from the CPU as necessary.

Figure 5:
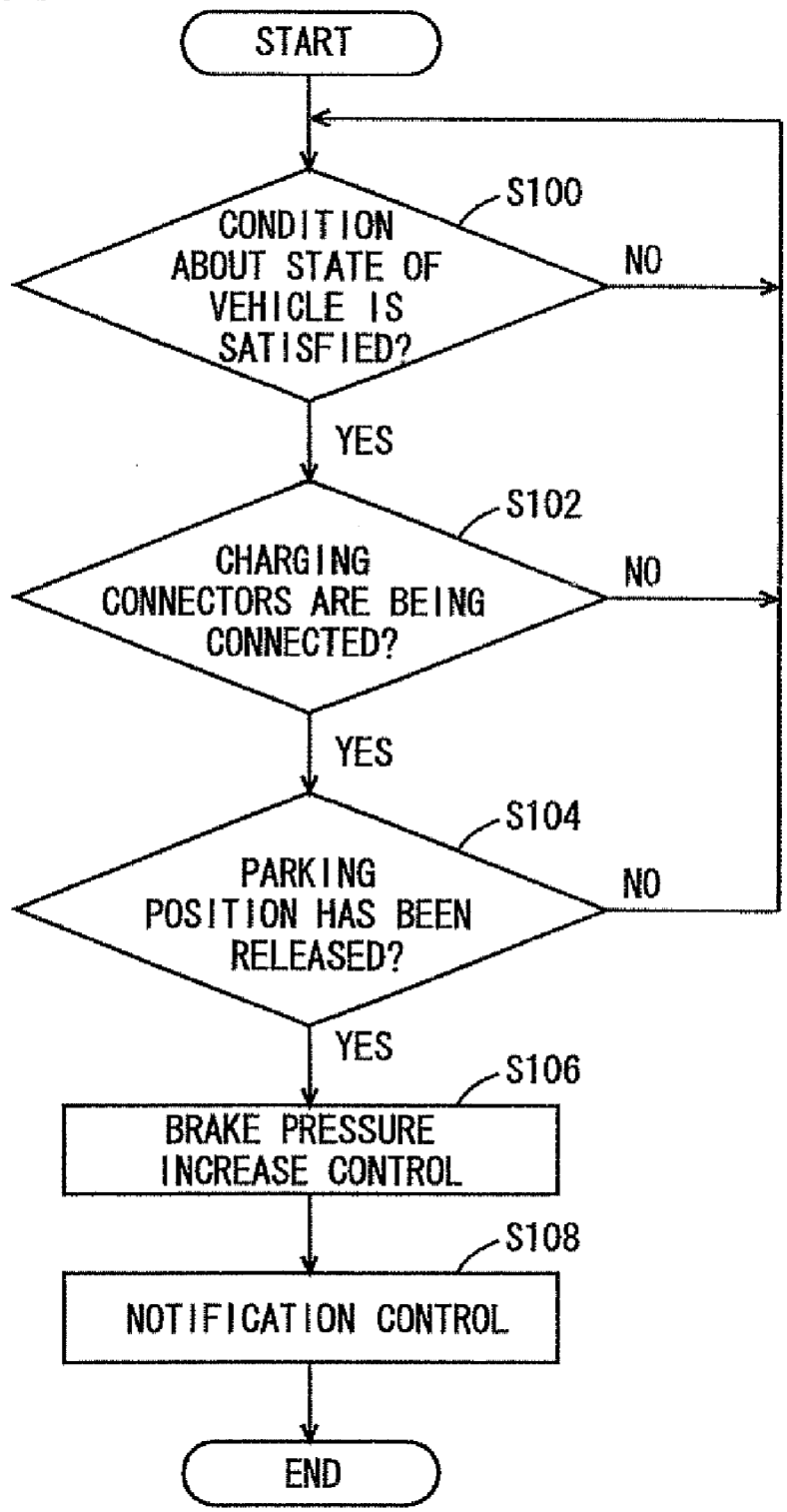
FIG. 5 is a flowchart showing a control structure of a program executed at the HV_ECU, which is the control device for the vehicle according to the present embodiment.

A control structure of a program executed at HV_ECU 320, which is the control device for the vehicle according to the present embodiment, will be described with reference to FIG. 5.

In step (denoted as "S" hereinafter) 100, HV_ECU 320 determines whether or not the condition about the state of the vehicle is satisfied. If the condition about the state of the vehicle is satisfied (YES in S100), the process proceeds to S102. If not (NO in S100), the process returns to S100.

In S102, HV_ECU 320 determines whether or not charging connector (1) 224 and charging connector (2) 502 are being connected. If charging connector (1) 224 and charging connector (2) 502 are being connected (YES in S102), the process proceeds to S104. If not (NO in S102), the process returns to S100.

In S104, HV_ECU 320 determines whether or not the parking position has been released. If the parking position has been released (YES in S104), the process proceeds to S106. If not (NO in S104), the process returns to S100.

In S106, HV_ECU 320 performs brake pressure increase control. Specifically, HV_ECU 320 transmits a brake pressure increase control signal to brake ECU 340. In S108, HV_ECU 320 performs notification control. Specifically, HV_ECU 320 transmits the notification control signal to notifying device 370.

A description will be given of operation of HV_ECU 320, which is the control device for the vehicle according to the present embodiment, based on the structure and the flowchart as described above.

Assume, for example, that charging connector (1) 224 and charging connector (2) 502 are being connected and battery 220 for running of the vehicle is being charged using the external power supply, with the parking position selected.

At this time, if the condition about the state of the vehicle is satisfied such as when the gradient of the road surface is equal to or larger than the predetermined gradient, when the amount of charge of auxiliary battery 382 is equal to or larger than the predetermined value, or when IG of the vehicle is turned on and selection of the neutral position is possible (YES in S100), it is determined that charging connector (1) 224 and charging connector (2) 502 are being connected. Therefore, it is determined whether or not the parking position is released (S104).

If the driver moves the shift lever to the N position and the like and the parking position is released (YES in S104), the brake pressure increase control is performed (S106). As a result, the degree of restriction of rotation of the wheel by braking device 358 increases regardless of the presence or absence of the driver's operation of the brake pedal. Therefore, even if restriction of rotation of wheel 160 by parking lock mechanism 206 is removed as a result of release of the parking position, movement of the vehicle is restricted.

Furthermore, the notification control is performed (S108), thereby notifying the driver that return of the shift position to the parking position is recommended.

As described above, in the control device for the vehicle according to the present embodiment, when the control condition that the charging connector (1) and the external power supply are being connected and the parking state has been released is satisfied, the degree of restriction of the braking device is increased. As a result, movement of the vehicle during charging can be restricted, even if restriction of movement of the vehicle is removed as a result of release of the parking state. In addition, such control can be performed using existing components without providing new components. Accordingly, there can be provided a control device and a control method for a vehicle that reliably restrict the position of the vehicle during charging using the power supply outside the vehicle, while suppressing an increase in the number of components and the cost.

Furthermore, when the condition that the gradient of the road surface is equal to or larger than the predetermined gradient and the condition that the amount of charge of the auxiliary battery is equal to or larger than the predetermined value are satisfied in addition to the control condition, the degree of restriction of rotation of the wheel by the braking device is increased. As a result, movement of the vehicle during charging can be reliably restricted.

In addition, movement of the vehicle can be restricted without prohibiting operation of the shift lever. Since the driver can operate the shift lever as usual, movement of the vehicle can be restricted without driver's misinterpretation that a failure has occurred in the vehicle, as compared with the case where operation of the shift lever is prohibited.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

The invention claimed is:

1. A control device for a vehicle having at least a motor as a drive source, said vehicle including a power storage device for supplying electric power to said motor, a charging connector for connection to an external power supply arranged outside said vehicle and used to charge said power storage device, a wheel, a braking device for receiving supply of hydraulic pressure and restricting rotation of said wheel, and a transmission for restricting movement of said vehicle when said vehicle shifts to a parking state and removing said restriction when said parking state is released, said control device comprising:
    a connection state detecting unit for detecting that said charging connector and said external power supply are being connected;
    a release detecting unit for detecting that the parking state of said vehicle has been released; and
    a control unit receiving outputs from said connection state detecting unit and said release detecting unit,
    said control unit increasing the hydraulic pressure supplied to said braking device such that a degree of restriction of rotation of said wheel increases after said parking state is released, when a control condition that said charging connector and said external power supply are being connected and said parking state has been released is satisfied.

2. The control device for the vehicle according to claim 1, further comprising
    a gradient detecting unit for detecting a gradient of a road surface, wherein
    said control unit controls said braking device such that the degree of restriction of rotation of said wheel increases, when a condition that said gradient is equal to or larger than a predetermined gradient is satisfied in addition to said control condition.

3. The control device for the vehicle according to claim 1, wherein
said braking device includes an electric pump for generating hydraulic pressure, and
said control unit controls said electric pump such that the degree of restriction of rotation of said wheel increases, when said control condition is satisfied.

4. The control device for the vehicle according to claim 3, wherein
said vehicle further includes an auxiliary battery for supplying electric power to said electric pump,
said control device further includes a charge amount detecting unit for detecting an amount of charge of said auxiliary battery, and
said control unit controls said braking device such that the degree of restriction of rotation of said wheel increases, when a condition that said amount of charge is equal to or larger than a predetermined amount of charge is satisfied in addition to said control condition.

5. The control device for the vehicle according to claim 1, wherein
said transmission causes said vehicle to shift to said parking state when a parking position is selected as a shift position, and
said transmission is provided with a parking lock mechanism for restricting rotation of a shaft coupled to said wheel of said vehicle using a gear mechanism when said parking position is selected.

6. A control method for a vehicle having at least a motor as a drive source, said vehicle including a power storage device for supplying electric power to said motor, a charging connector for connection to an external power supply arranged outside said vehicle and used to charge said power storage device, a wheel, a braking device for receiving supply of hydraulic pressure and restricting rotation of said wheel, and a transmission for restricting movement of said vehicle when said vehicle shifts to a parking state and removing said restriction when said parking state is released, a control method comprising the steps of:
detecting that said charging connector and said external power supply are being connected;
detecting that the parking state of said vehicle has been released; and
increasing the hydraulic pressure supplied to said braking device such that a degree of restriction of rotation of said wheel increases after said parking state is released, when a control condition that said charging connector and said external power supply are being connected and said parking state has been released is satisfied.

7. The control method for the vehicle according to claim 6, further comprising the step of
detecting a gradient of a road surface, wherein
in the step of controlling said braking device, said braking device is controlled such that the degree of restriction of rotation of said wheel increases, when a condition that said gradient is equal to or larger than a predetermined gradient is satisfied in addition to said control condition.

8. The control method for the vehicle according to claim 6, wherein
said braking device includes an electric pump for generating hydraulic pressure, and
in the step of controlling said braking device, said electric pump is controlled such that the degree of restriction of rotation of said wheel increases, when said control condition is satisfied.

9. The control method for the vehicle according to claim 8, wherein
said vehicle further includes an auxiliary battery for supplying electric power to said electric pump,
said control method further includes the step of detecting an amount of charge of said auxiliary battery, and
in the step of controlling said braking device, said braking device is controlled such that the degree of restriction of rotation of said wheel increases, when a condition that said amount of charge is equal to or larger than a predetermined amount of charge is satisfied in addition to said control condition.

10. The control method for the vehicle according to claim 6, wherein
said transmission causes said vehicle to shift to said parking state when a parking position is selected as a shift position, and
said transmission is provided with a parking lock mechanism for restricting rotation of a shaft coupled to said wheel of said vehicle using a gear mechanism when said parking position is selected.

11. The control device for the vehicle according to claim 1, further comprising
a notifying unit for notifying a driver that return of a state of said vehicle to said parking state is recommended.

12. The control method for the vehicle according to claim 6, further comprising the step of
notifying a driver that return of a state of said vehicle to said parking state is recommended.

13. The control device for the vehicle according to claim 2, wherein
said transmission causes said vehicle to shift to said parking state when a parking position is selected as a shift position, and
said transmission is provided with a parking lock mechanism for restricting rotation of a shaft coupled to said wheel of said vehicle using a gear mechanism when said parking position is selected.

14. The control device for the vehicle according to claim 3, wherein
said transmission causes said vehicle to shift to said parking state when a parking position is selected as a shift position, and
said transmission is provided with a parking lock mechanism for restricting rotation of a shaft coupled to said wheel of said vehicle using a gear mechanism when said parking position is selected.

15. The control device for the vehicle according to claim 4, wherein
said transmission causes said vehicle to shift to said parking state when a parking position is selected as a shift position, and
said transmission is provided with a parking lock mechanism for restricting rotation of a shaft coupled to said wheel of said vehicle using a gear mechanism when said parking position is selected.

16. The control method for the vehicle according to claim 7, wherein
said transmission causes said vehicle to shift to said parking state when a parking position is selected as a shift position, and
said transmission is provided with a parking lock mechanism for restricting rotation of a shaft coupled to said wheel of said vehicle using a gear mechanism when said parking position is selected.

17. The control method for the vehicle according to claim 8, wherein
said transmission causes said vehicle to shift to said parking state when a parking position is selected as a shift position, and
said transmission is provided with a parking lock mechanism for restricting rotation of a shaft coupled to said wheel of said vehicle using a gear mechanism when said parking position is selected.

18. The control method for the vehicle according to claim 9, wherein
said transmission causes said vehicle to shift to said parking state when a parking position is selected as a shift position, and
said transmission is provided with a parking lock mechanism for restricting rotation of a shaft coupled to said wheel of said vehicle using a gear mechanism when said parking position is selected.

* * * * *